(12) United States Patent
Mori (10) Patent No.: US 10,220,692 B2
(45) Date of Patent: Mar. 5, 2019

(54) GLASS RUN

(71) Applicant: NISHIKAWA RUBBER CO., LTD., Hiroshima-shi, Hiroshima-ken (JP)

(72) Inventor: Kousuke Mori, Hiroshima (JP)

(73) Assignee: NISHIKAWA RUBBER CO., LTD., Hiroshiam-Shi, Hiroshima-Ken (JP)

( * ) Notice: Subject to any disclaimer, the term of this patent is extended or adjusted under 35 U.S.C. 154(b) by 0 days.

(21) Appl. No.: 15/667,615

(22) Filed: Aug. 2, 2017

(65) Prior Publication Data

US 2018/0037100 A1 Feb. 8, 2018

(30) Foreign Application Priority Data

Aug. 3, 2016 (JP) ................... 2016-153057
Jul. 12, 2017 (JP) ................... 2017-136001

(51) Int. Cl.
| | | |
|---|---|---|
| B60J 10/76 | (2016.01) | |
| B60J 10/20 | (2016.01) | |
| B60J 10/33 | (2016.01) | |
| B60J 10/88 | (2016.01) | |
| B60J 5/04 | (2006.01) | |

(52) U.S. Cl.
CPC ............ B60J 10/76 (2016.02); B60J 10/20 (2016.02); B60J 10/33 (2016.02); B60J 10/88 (2016.02); *B60J 5/0402* (2013.01)

(58) Field of Classification Search
CPC .................................. B60J 10/20; B60J 10/76
USPC ...................................................... 49/490.1
See application file for complete search history.

(56) References Cited

U.S. PATENT DOCUMENTS

| | | | | |
|---|---|---|---|---|
| 8,079,180 | B2* | 12/2011 | Titz | B60J 10/18 |
| | | | | 49/440 |
| 9,845,000 | B2* | 12/2017 | Kojima | B60J 5/0402 |
| 9,969,250 | B2* | 5/2018 | Takeda | B60J 10/27 |
| 2001/0001917 | A1* | 5/2001 | Goto | B60J 10/79 |
| | | | | 49/440 |
| 2004/0111973 | A1* | 6/2004 | Moisy | B60J 10/18 |
| | | | | 49/490.1 |
| 2007/0101656 | A1* | 5/2007 | Stipp | B60J 10/78 |
| | | | | 49/490.1 |
| 2013/0305612 | A1* | 11/2013 | Murree | E06B 7/2314 |
| | | | | 49/483.1 |
| 2015/0089878 | A1* | 4/2015 | Otsuka | B60J 10/88 |
| | | | | 49/440 |

(Continued)

FOREIGN PATENT DOCUMENTS

| | | |
|---|---|---|
| DE | 102010034340 A1 | 4/2012 |
| JP | 2015067109 A | 4/2015 |

*Primary Examiner* — Marcus Menezes
(74) *Attorney, Agent, or Firm* — Holtz, Holtz & Volek PC (57) ABSTRACT

A glass run couples to an outer-cabin side of a frame and includes a body and an installation member. The body includes an outer-cabin side wall, an inner-cabin side wall and a glass run side wall. The installation member is assembled on a flange having a plurality of elevated parts formed at regular intervals, has a substantially U-shaped cross-section including the glass run side wall, a body side wall and a connecting wall and has an anchoring part formed on an inner side for receiving the plurality of elevated parts on the flange. A thin part is formed by providing a concave part on an inner side of a connecting part between the body side wall and the connecting wall of the installation member.

14 Claims, 8 Drawing Sheets

(56) References Cited

U.S. PATENT DOCUMENTS

| 2016/0089962 | A1* | 3/2016 | Kuroki | B60J 10/30 |
| | | | | 49/442 |
| 2017/0136861 | A1* | 5/2017 | Kojima | B60J 10/76 |
| 2017/0260788 | A1* | 9/2017 | Takahashi | B60J 10/76 |
| 2017/0361693 | A1* | 12/2017 | Miyata | B60J 10/763 |

* cited by examiner

GLASS RUN

CROSS REFERENCE TO RELATED APPLICATION

This application claims the benefit under 35 USC § 119 of JP Patent Applications JP 2016-153057 filed Aug. 3, 2016 and JP 2017-136001 filed Jul. 12, 2017, the entire disclosure of which is incorporated herein by reference.

BACKGROUND INFORMATION

The present invention relates to glass runs configured to operably couple to frames of automobile doors for guiding door glasses lifting or lowering.

Figure 5:
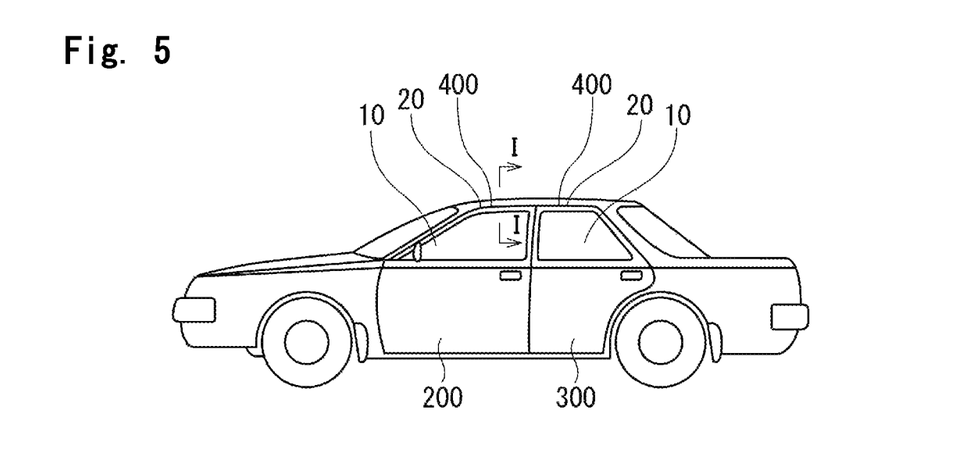
FIG. 5 is a side view of an automobile.

As shown in FIG. 5, an ordinary glass run 20 has been configured to operably couple to a frame 400 of a front door 200 and a rear door 300 of an automobile for guiding a door glass 10 lifting or lowering.

Figure 6:
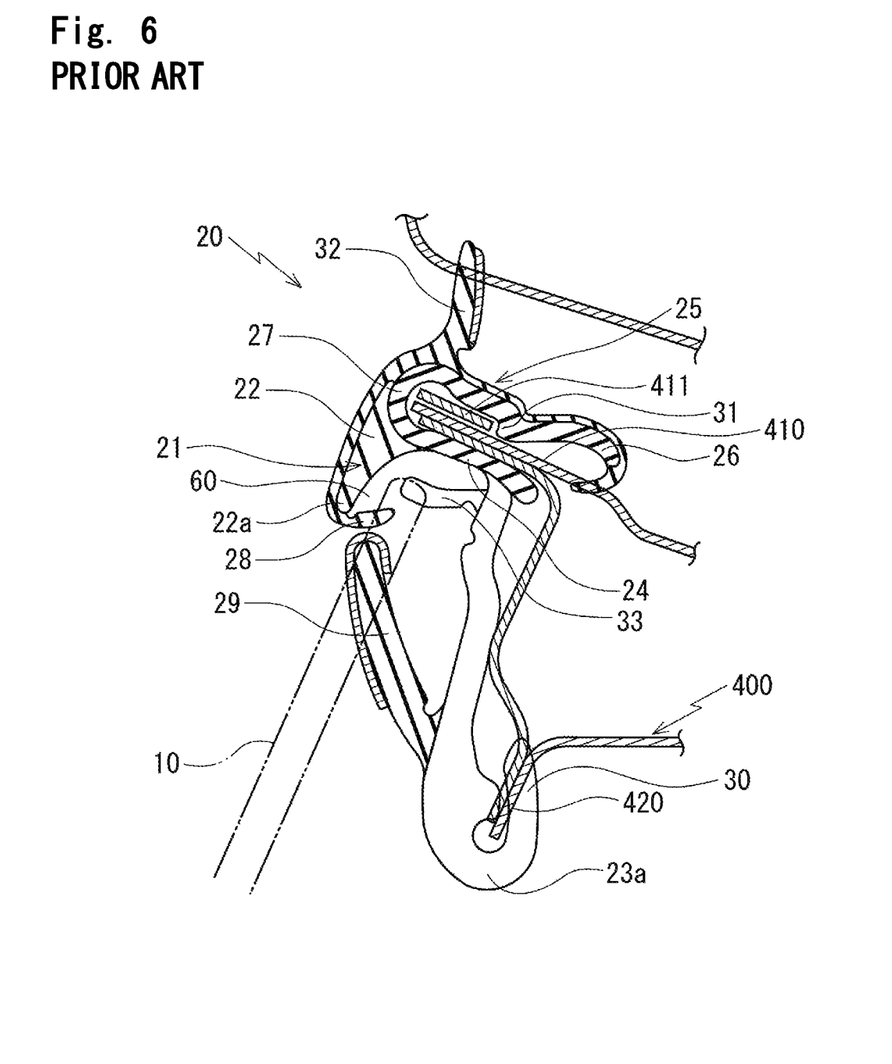
FIG. 6 is an enlarged sectional view of a glass run according to a prior art taken along line I-I of FIG. 5.

FIG. 6 shows the glass run 20 configured to operably couple to the front door 200. The glass run 20, which is so-called "hidden type", covers up a part of the frame 400 from an outer-cabin side.

The glass run 20 includes: a body 21; an installation member 25; an outer lip 28; an inner lip 29; and a decorative lip 30. The body 21 includes: an outer-cabin side wall 22; an inner-cabin side wall 23; and a glass run side wall 24, which connects the side walls 22, 23 and forms a channel 60. The installation member 25 is formed on an outer side of the body 21, has a substantially U-shaped cross-section including the glass run side wall 24, a body side wall 26 and a connecting wall 27 which connects the side walls 24, 26, and is assembled on a flange (first flange) 410. The flange (first flange) 410 extends outwardly from the frame 400 toward an exterior of the automobile. The outer lip 28 extends toward an interior of the automobile from an end 22a of the outer-cabin side wall 22 and is slidably brought into contact with a door glass 10. The inner lip 29 extends toward the exterior of the automobile from a position on an outer-cabin side surface of the inner-cabin side wall 23 and is slidably brought into contact with the door glass 10, the position being at a distance toward a side of the glass run side wall 24 from an end 23a of the inner-cabin side wall 23. The decorative lip 30 extends from the end 23a of the inner-cabin side wall 23 for fastening a flange (second flange) 420 together with the inner-cabin side wall 23. The flange (second flange) 420 extends from an inner-cabin side of the frame 400 toward an inner side.

A seal lip 33 is formed on the inner-cabin side wall 23 on a side of the glass run side wall 24 and makes elastic contact with a top end of the door glass 10 when the door glass 10 is in a closed position.

Figure 8:
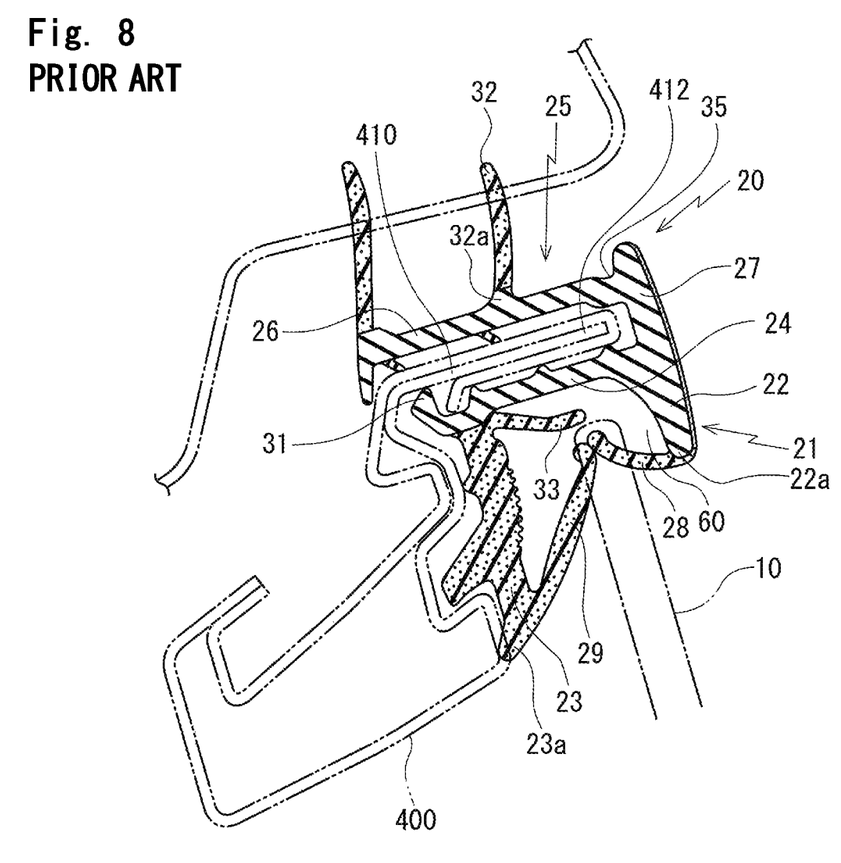
FIG. 8 is an enlarged sectional view of another glass run according to a prior art taken along line I-I of FIG. 5.
Figure 9:
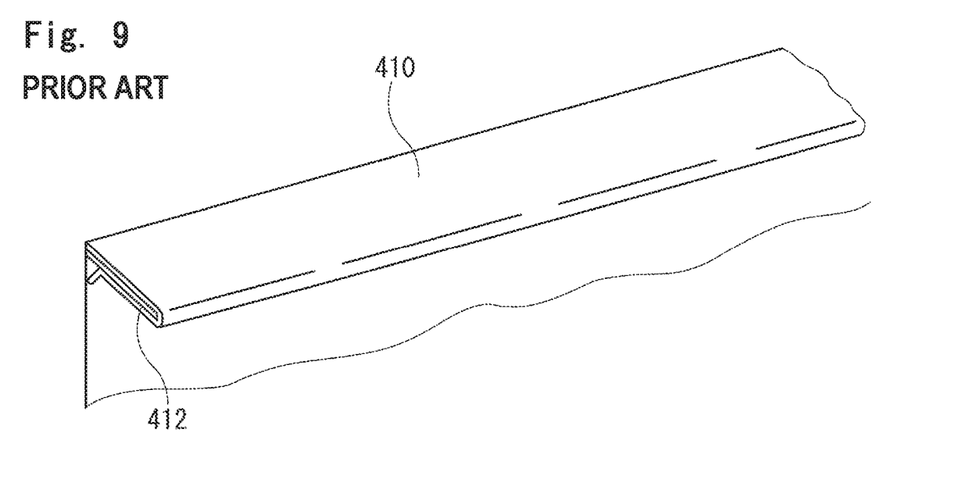
FIG. 9 is a perspective view of a flange on which the glass run illustrated in FIG. 8 is assembled.

The flange of the frame 400, on which the glass run 20 is assembled, is generally formed of a singular plate or two piled plates. Examples of known configuration of the flange, on which the glass run 20 is assembled, include: a flange 410 of FIG. 6 and FIG. 7 with a plurality of elevated parts 411 formed on an outside surface at regular intervals; and a flange 410 of FIG. 8 and FIG. 9 with a hemming flange part 412 formed by folding a top end of the flange 410 toward an interior of the automobile (see, for example, German unexamined Patent Publication No. 102010034340, Japanese unexamined Patent Publication No. 2015-067109). The installation member 25, which has the substantially U-shaped cross-section, generally has a metal core buried therein or is made of resin material with high rigidity for maintaining a cross-sectional shape after assembly on the flange (first flange) 410. FIG. 8 shows an example that the installation member 25 mainly includes the resin material with high rigidity.

The installation member 25 has an anchoring part 31 on an inner side for receiving the elevated parts 411 or the hemming flange parts 412.

A body seal lip 32 is formed on an outer side of the body side wall 26 and makes elastic contact with a circumferential edge of a door opening of an automobile body. Also, in case the installation member 25 mainly includes the resin material with high rigidity, a thin part 35 is formed on a position on the body side wall 26 closer to the connecting wall 27 than a base root 32a of the body seal lip 32 (see, for example, FIG. 4 of Japanese unexamined Patent Publication No. 2015-067109).

The thin part 35 is formed for widening an angle of an opening of the installation member 25 and smoothly fitting the installation member 25 on the flange 410. The thin part 35 is especially effective when the installation member 25 mainly includes the resin material with high rigidity and the glass run 20 is assembled on the flange 410 with the elevated parts 411 or the hemming flange parts 412, which are increased in thickness.

Unfortunately, however, the thin part 35, which is a channel formed on an outer surface of the body side wall 26 of the glass run 20, degrades appearance.

In addition, since the installation member 25 mainly includes the resin material with high rigidity, when cutting out the glass run 20 formed by extrusion molding at regular intervals, the glass run 20 may be partially torn into wrinkles between a cutting surface and the thin part 35, and then chlorosis which may remain on the glass run 20 degrades appearance even worse.

Therefore, an object of the present invention is to provide the glass runs which are easy to assemble on the flanges without degrading appearance.

SUMMARY

In order to achieve the above-mentioned object, according to one aspect of the invention, a glass run (20) of an automobile door (200) is provided, for guiding a door glass (10) in a frame (400), the glass run (20) including: a body (21) including an outer-cabin side wall (22), an inner-cabin side wall (23) and a glass run side wall (24) which connects the outer-cabin side wall (22) and the inner-cabin side wall (23) and forms a channel (60); and an installation member (25) which is assembled on a flange (410), which has a substantially U-shaped cross-section including the glass run side wall (24), a body side wall (26) and a connecting wall (27) which connects the glass run side wall (24) and the body side wall (26), and which has an anchoring part (31) on an inner side for receiving a plurality of elevated parts (411), the flange (410) extending outwardly from the frame (400) toward an exterior of an automobile, the flange (410) having the plurality of elevated parts (411) formed on an outside surface thereof at regular intervals, the elevated parts (411) rising from the outside surface of the flange (410) toward an outer side, the body side wall (26) facing a circumferential edge of a door opening of an automobile body, wherein a thin part (51, 52, 53) is formed by providing a concave part on an inner side of a connecting part between the body side wall (26) and the connecting wall (27) of the installation member (25).

In addition, according to an aspect of the present invention, a glass run (20) of an automobile door (200) is provided, for guiding a door glass (10) in a frame (400), the glass run (20) including: a body (21) including an outer-cabin side wall (22), an inner-cabin side wall (23) and a glass run side wall (24) which connects the outer-cabin side wall (22) and the inner-cabin side wall (23) and forms a channel (60); and an installation member (25) which is assembled on a flange (410), which has a substantially U-shaped cross-section including the glass run side wall (24), a body side wall (26) and a connecting wall (27) which connects the glass run side wall (24) and the body side wall (26), and which has an anchoring part (31) on an inner side for receiving a top end (412) of the flange (410), the flange (410) extending outwardly from the frame (400) toward an exterior of an automobile, the top end (412) of the flange (410) being folded inwardly toward an interior of the automobile, the body side wall (26) facing a circumferential edge of a door opening of an automobile body, wherein a thin part (51, 52, 53) is formed by providing a concave part on an inner side of a connecting part between the body side wall (26) and the connecting wall (27) of the installation member (25).

In addition, according to an aspect of the present invention, a body seal lip (55) extends from the body side wall (26) of the installation member (25) and a base root (55a) of the body seal lip (55) is on an outer side of the connecting part between the body side wall (26) and the connecting wall (27) of the installation member (25), the body seal lip (55) making elastic contact with the circumferential edge of the door opening of the automobile body.

In addition, according to an aspect of the present invention, a decorative member (56) is provided on an outer-cabin side of the connecting wall (27) of the installation member (25).

In addition, according to an aspect of the present invention, the thin part (51) is formed by providing the concave part toward the body side wall (26) from the inner side of the connecting part between the body side wall (26) and the connecting wall (27) of the installation member (25).

In addition, according to an aspect of the present invention, the thin part (52) is formed by providing the concave part toward the connecting wall (27) from the inner side of the connecting part between the body side wall (26) and the connecting wall (27) of the installation member (25).

In addition, according to an aspect of the present invention, the thin part (53) is formed by providing the concave part over the body side wall (26) and the connecting wall (27) from the inner side of the connecting part between the body side wall (26) and the connecting wall (27) of the installation member (25).

It is to be noted that "the thin part (51, 52, 53) formed by providing the concave part" may be formed simultaneously with molding of the glass run by extrusion or posterior to the molding of the glass run by extrusion.

Symbols in parentheses show constituents or items corresponding to the drawings.

According to the present invention, the installation member of the glass run, which is assembled on the flange with parts increased in thickness, has the thin part formed thereon. This configuration widens an angle of an opening of the installation member, fits the installation member on the flange more smoothly and simplifies assembly of the glass run. Examples of the parts increased in thickness on the flange include the plurality of elevated parts formed on the outside surface of the flange at regular intervals.

The thin part is formed by providing the concave part on the inner side of the connecting part between the body side wall and the connecting wall of the installation member. This configuration does not expose a channel outside or degrade appearance. When cutting out the glass run formed by extrusion molding at regular intervals, the glass run may be partially torn into wrinkles between a cutting surface and the thin part, and then chlorosis may remain on the glass run. The chlorosis, which is not exposed, does not degrade appearance.

Examples of the parts increased in thickness on the flange, on which the glass run of the present invention is assembled, include hemming flange parts formed by folding the top end of the flange inwardly toward the interior of the automobile as well as the elevated parts. In both examples, the flanges extend outwardly from the frames toward an exterior of the automobiles. The thin part, which is formed on the installation member, widens the angle of the opening of the installation member. Also, the thin part, which is formed on the inner side, prevents degradation in appearance.

In addition, the base root of the body seal lip which extends from the body side wall is on the outer side of the connecting part between the body side wall and the connecting wall of the installation member. Accordingly, the body seal lip covers the thin part on the inner side of the connecting part from an outside of the body side wall.

With this configuration, the body seal lip covers up the chlorosis which may appear on an outer side surface of the body side wall in case the glass run is partially torn into wrinkles between the cutting surface and the thin part.

In addition, the decorative member is provided on the outer-cabin side of the connecting wall of the installation member. Accordingly, the decorative member covers the thin part on the inner side of the connecting part from the outside of the connecting wall.

With this configuration, the decorative member covers up the chlorosis which may appear on the outer side surface of the connecting wall in case the glass run is partially torn into wrinkles between the cutting surface and the thin part.

The thin part is formed by providing the concave part toward the body side wall, toward the connecting wall, or over the body side wall and the connecting wall, from the inner side of the connecting part between the body side wall and the connecting wall of the installation member, respectively.

DETAILED DESCRIPTION

Figure 1:
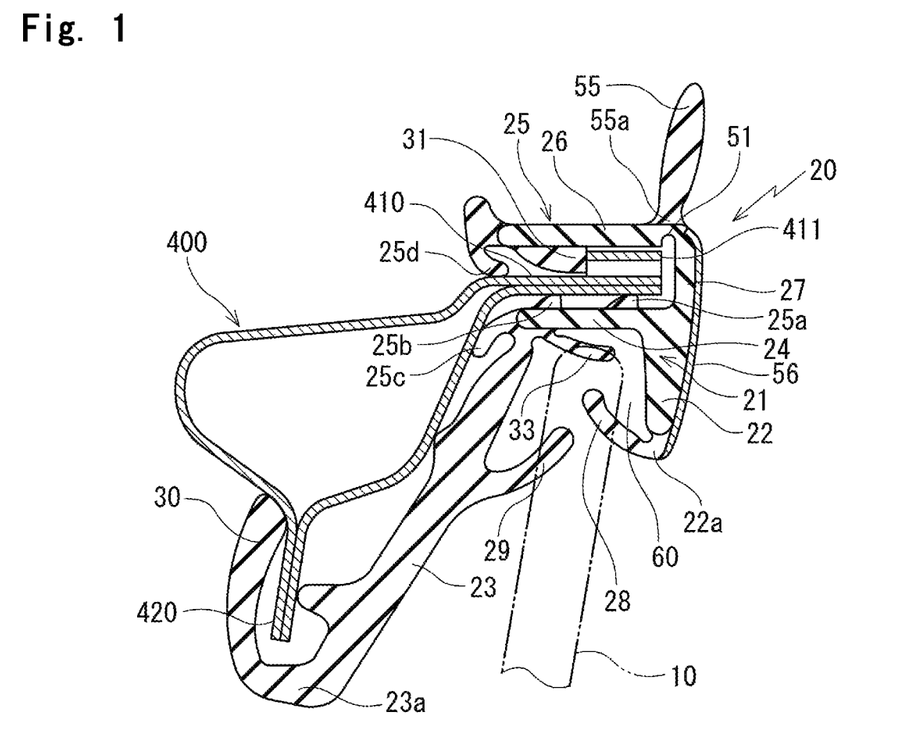
FIG. 1 is an enlarged sectional view of a glass run according to a first embodiment of the present invention taken along line I-I of FIG. 5.

Referring to FIG. 1, a glass run according to an embodiment of the present invention will be described. When constituents or items correspond to those in prior arts (FIG. 6), the same symbols are used.

A glass run 20 according to an embodiment of the present invention is configured to operably couple to an outer-cabin side of a frame 400 of a front door 200 and a rear door 300 of an automobile shown in FIG. 5. The glass run 20 is of so-called "hidden type" which covers up a part of the frame 400 from the outer-cabin side.

FIG. 1 illustrates the glass run 20, which is configured to operably couple to an upper side of the front door 200 and which is formed by extrusion molding.

The glass run 20 includes a body 21 and an installation member 25, which are integrally molded. The body 21 has a channel 60 therein and guides a door glass 10 lifting or lowering. The installation member 25 is assembled on a flange 410.

Figure 7:
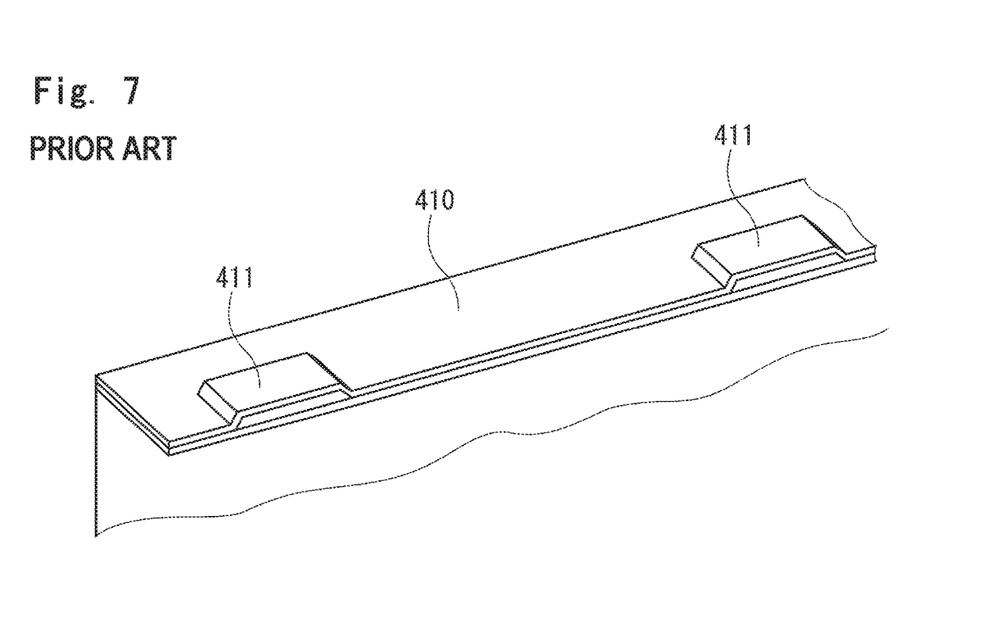
FIG. 7 is a perspective view of a flange on which the glass run illustrated in FIG. 6 is assembled.

The flange 410 extends outwardly from the frame 400 toward the exterior of the automobile and, as shown in FIG. 7, has a plurality of elevated parts 411 formed on an outside surface thereof at regular intervals. The elevated parts 411 rise from the outside surface of the flange 410 toward an outer side, in an upward direction in the present embodiment. FIG. 1 illustrates the installation member 25 of the glass run 20 assembled on the elevated part 411. Except for the elevated parts 411, the installation member 25 of the glass run 20 fastens the flange 410 formed of two plates which are directly piled.

The body 21 has a substantially J-shaped cross-section and includes: an outer-cabin side wall 22; an inner-cabin side wall 23, which is longer than the outer-cabin side wall 22 in cross section; and a glass run side wall 24, which connects the outer-cabin side wall 22 and the inner-cabin side wall 23.

An outer lip 28 extends inwardly toward an interior of the automobile from an end 22a of the outer-cabin side wall 22 and is slidably brought into contact with an outer-cabin side surface of the door glass 10. An inner lip 29 is formed on a position on an outer-cabin side surface of the inner-cabin side wall 23, which is at a distance toward a side of the glass run side wall 24 from an end 23a of the inner-cabin side wall 23. The inner lip 29 extends outwardly toward an exterior of the automobile and is slidably brought into contact with an inner-cabin side surface of the door glass 10.

A decorative lip 30 is formed on the end 23a of the inner-cabin side wall 23 and is folded inwardly toward the interior of the automobile. The decorative lip 30, together with the inner-cabin side wall 23, fastens a flange (second flange) 420 and covers an end of the second flange 420. The second flange 420 extends toward an inner side (lower side) from an inner-cabin side of the frame 400. A seal lip 33 extends from an inner side of a connecting part between the inner-cabin side wall 23 and the glass run side wall 24 and makes elastic contact with an end of the door glass 10, but may be omitted.

The installation member 25 has a substantially U-shaped cross-section and includes: the glass run side wall 24; a body side wall 26, which faces a circumferential edge of a door opening of an automobile body; and a connecting wall 27, which connects the glass run side wall 24 and the body side wall 26. The glass run side wall 24 forms both the body 21 and the installation member 25. The elevated part 411 of the frame 400 is on an outer side of the glass run side wall 24 and the door glass 10 is guided toward an inner side of the glass run side wall 24.

A plurality of holding lips 25a, 25b, 25c, 25d are formed on the outer side and an end of the glass run side wall 24 and an end of the body side wall 26, respectively, for clasping the flange 410.

An anchoring part 31 is formed on an inner side of the body side wall 26. The anchoring part 31 has a surface which abuts with and receives the elevated part 411 of the flange 410. A holding lip may be formed on the anchoring part 31 extra for clasping the flange 410.

A body seal lip 55 extends from an outer side of the body side wall 26 and makes elastic contact with the circumferential edge of the door opening of the automobile body for sealing a gap between the body and the door 200.

The installation member 25 mainly includes the resin material with high rigidity. The installation member 25 is higher in rigidity than the holding lips 25a, 25b, 25c, 25d, the body seal lip 55 and so on.

A thin part 51, which is reduced in thickness, is formed by providing a concave part on an inner side of a connecting part between the body side wall 26 and the connecting wall 27 of the installation member 25 so that a remaining part of the connecting part forms the thin part 51. A thin part according to the prior art (FIG. 6, FIG. 8), which is exposed on the outer side of the installation member 25, is not formed.

The thin part 51 is formed by providing the concave part toward the body side wall 26 from the inner side of the connecting part between the body side wall 26 and the connecting wall 27 of the installation member 25. In addition, a base root 55a of the body seal lip 55 is on the outer side of the connecting part between the body side wall 26 and the connecting wall 27 of the installation member 25 for covering the thin part 51 from an outside.

In addition, a decorative member 56 is provided on an outer-cabin side of the connecting wall 27 of the installation member 25.

The thin part 51 is formed on a position closer to an outer side of the connecting part between the body side wall 26 and the connecting wall 27 of the installation member 25. The thin part 51 is formed by providing the concave part on the inner side of the connecting part simultaneously with molding of the glass run 20 by extrusion. Alternatively, the thin part 51 may be formed by providing the concave part posterior to molding of the glass run 20 by extrusion.

Examples of material of the glass run 20, except for the installation member 25, include EPDM rubber and thermoplastic elastomer such as olefinic thermoplastic elastomer, styrene-based thermoplastic elastomer, but are not particularly limited. Products may include a singularity of or a plurality of these materials. Also, the material may be foamed. Since the glass run 20, except for the installation member 25, includes material which is softer than the installation member 25, chlorosis of the body seal lip 55 or the decorative member 56, for example, is prevented.

In the present embodiment, the installation member 25 mainly includes the material with high rigidity including thermoplastic resin (polyester resin such as polypropylene (PP), polyethylene (PE), nylon, PVC (vinyl chloride), PBT, for example) and thermoplastic elastomer (TPE). More specifically, the installation member 25 of the present embodiment mainly includes thermoplastic elastomer (TPE) of which main components are polypropylene (PP) excellent in heat-resisting property, amorphous polymer (rubber) and filler. Examples of amorphous polymer (rubber) include olefinic rubber and styrene-based rubber but EPM (ethylene—propylene rubber) is preferable. Examples of filler include glass fiber and talc which is more preferable. The installation member 25, which includes polypropylene (PP) alone, is too high in rigidity, fragile, easy to break and lacks elasticity. The installation member 25, which includes polypropylene (PP) and amorphous polymer (rubber) only, is too low in rigidity to be stabilized in shape during extrusion molding. Accordingly, the installation member 25 preferably includes polypropylene (PP), amorphous polymer (rubber) and filler.

According to the glass run 20 of the embodiment of the present invention, the installation member 25 of the glass run 20, which is assembled on the flange 410 with parts increased in thickness, has the thin part 51 formed thereon. This configuration widens an angle of an opening of the installation member 25, fits the installation member 25 on the flange 410 more smoothly and simplifies assembly of the glass run 20. Examples of the parts increased in thickness on the flange 410 include the plurality of elevated parts 411 formed on the outside surface of the flange 410 at regular intervals.

The thin part 51 is formed by providing the concave part on the inner side of the connecting part between the body side wall 26 and the connecting wall 27 of the installation member 25. This configuration, without the thin part on the outer side, does not expose a channel outside or degrade appearance. In addition, when cutting out the glass run 20 formed by extrusion molding at regular intervals during manufacture of the glass run 20, the glass run may be partially torn into wrinkles between a cutting surface and the thin part, and then chlorosis may remain on the glass run. Since the thin part 51 is formed on the inner side, the resultant chlorosis is not exposed.

In addition, the base root 55*a* of the body seal lip 55, which extends from the body side wall 26, is on the outer side of the connecting part between the body side wall 26 and the connecting wall 27 of the installation member 25. Accordingly, the body seal lip 55 covers the thin part 51, which is formed by providing the concave part on the inner side of the connecting part, from an outside of the body side wall 26.

With this configuration, the body seal lip 55 covers up the chlorosis which may appear on an outer side surface of the body side wall 26 in case the glass run 20 is partially torn into wrinkles between the cutting surface and the thin part 51.

In addition, the decorative member 56 is provided on the outer-cabin side of the connecting wall 27 of the installation member 25. Accordingly, the decorative member 56 covers the thin part 51 from the outside of the connecting wall 27.

With this configuration, the decorative member 56 covers up the chlorosis which may appear on the outer side surface of the connecting wall 27 in case the glass run 20 is partially torn into wrinkles between the cutting surface and the thin part 51.

The glass run 20 according to the embodiment of the present invention is configured to operably couple to the frame 400 of the front door 200. But the glass run of the present invention is also applicable to the glass run 20 configured to operably couple to the frame 400 of the rear door 300.

Figure 2:
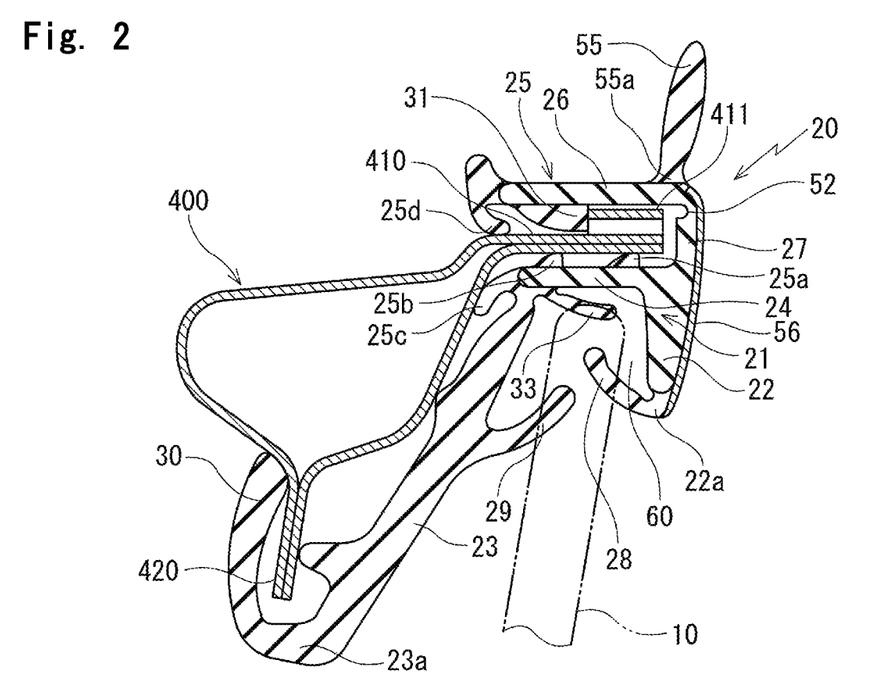
FIG. 2 is an enlarged sectional view of a glass run according to a second embodiment of the present invention taken along line I-I of FIG. 5.
Figure 3:
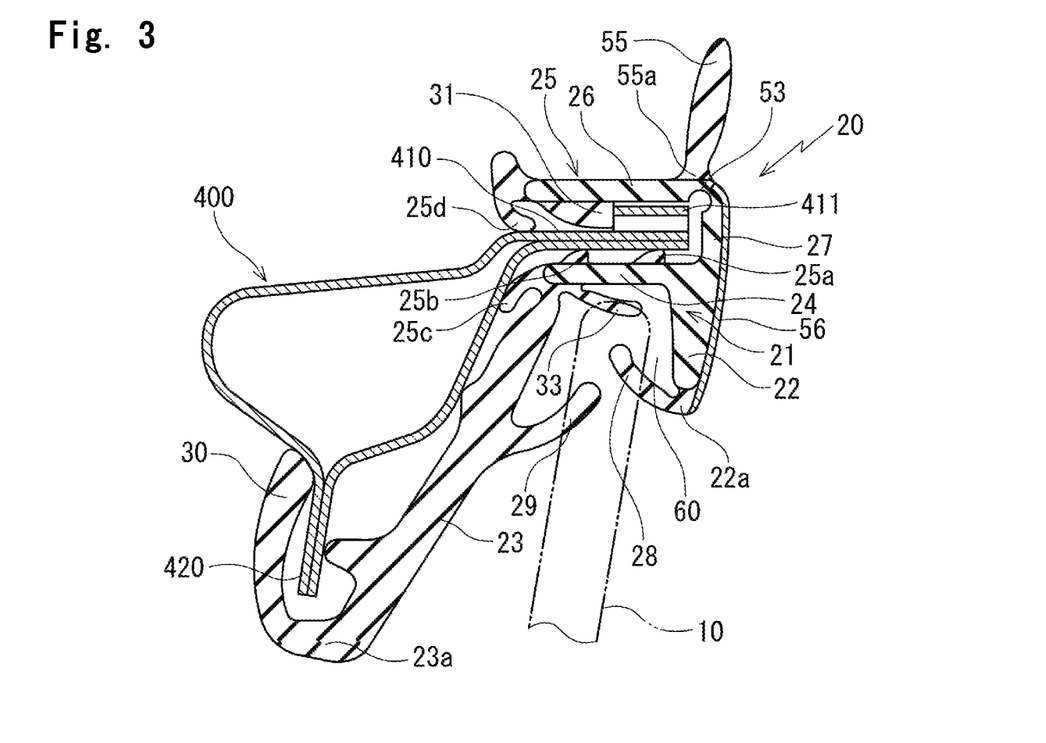
FIG. 3 is an enlarged sectional view of a glass run according to a third embodiment of the present invention taken along line I-I of FIG. 5.
Figure 4:
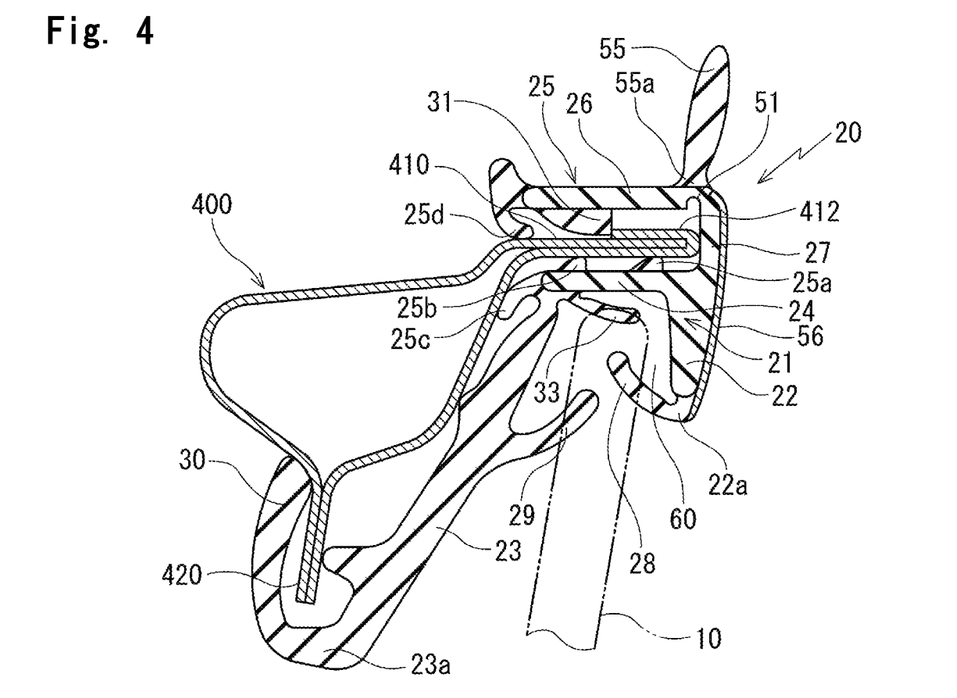
FIG. 4 is an enlarged sectional view of a glass run according to a fourth embodiment of the present invention taken along line I-I of FIG. 5.

The thin part 51 according to the embodiment of the present invention is formed by providing the concave part toward the body side wall 26 from the inner side of the connecting part between the body side wall 26 and the connecting wall 27 of the installation member 25. Alternatively, as shown in FIG. 2, a thin part 52 may be formed by providing the concave part toward the connecting wall 27 from the inner side of the connecting part between the body side wall 26 and the connecting wall 27 of the installation member 25. Also, as shown in FIG. 3, a thin part 53 may be formed by providing the concave part over the body side wall 26 and the connecting wall 27 from the inner side of the connecting part between the body side wall 26 and the connecting wall 27 of the installation member 25.

The glass run 20 according to the embodiment of the present invention is assembled on the flange 410 with the elevated parts 411. But the glass run of the present invention is also applicable to the glass run 20, assembled on the flange 410 with the parts increased in thickness including the hemming flange parts 412, for example. The flanges 410 of the hemming flange parts 412 extend outwardly from the frames 400 toward an exterior of the automobiles and top ends of the flanges 410 are folded inwardly toward an interior of the automobiles. In case the glass run 20 is assembled on the hemming flange parts 412 also, the thin part 51 (alternatively, thin part 52 or 53 shown in FIG. 2 or FIG. 3) widens the angle of the opening of the installation member 25, and the thin part 51, which is formed by providing the concave part on the inner side, does not degrade appearance.

The base root 55*a* of the body seal lip 55 and the decorative member 56 according to the embodiment of the present invention cover the thin part 51, 52, 53 from the outer side and improve appearance. But degradation in appearance is sufficiently prevented only by forming the thin part 51, 52, 53 by providing the concave part on the inner side of the installation member 25 and omitting at least one of covering the thin part 51, 52, 53 with the base root 55*a* of the body seal lip 55 and covering the thin part 51, 52, 53 with the decorative member 56.

I claim:
1. A glass run for a door of an automobile, for guiding a door glass in a frame, the glass run comprising:
a body including an outer-cabin side wall, an inner-cabin side wall, and a glass run side wall which connects the outer-cabin side wall and the inner-cabin side wall and forms a channel;
an installation member having a substantially U-shaped cross-section, the installation member comprising:
the glass run side wall;
a body side wall;
a connecting wall which connects the glass run side wall and the body side wall;
a connecting part at which the body side wall is connected to the connecting wall;
an anchoring part formed on an inner side of the installation member; and
a concave part provided as a channel recessed into an inner side of the connecting part, such that the connecting part is thinner than parts of the body side wall and the connecting wall that are adjacent to the connecting part, wherein the concave part extends in a direction from the inner side of the connecting part toward an outer side of the body side wall of the installation member; and
a decorative member provided on an outer-cabin side of the connecting wall of the installation member;
wherein the installation member is configured to be assembled on a flange that extends outwardly from the frame toward an exterior of the automobile, the flange having a plurality of elevated parts rising from an outside surface thereof at regular intervals;

wherein the anchoring part of the installation member is configured to receive the elevated parts of the flange; and wherein the body side wall of the installation member is configured to face a circumferential edge of a door opening of a body of the automobile.

2. The glass run according to claim 1, further comprising:
a body seal lip which extends outward from the body side wall of the installation member;
wherein a base root of the body seal lip is on an outer side of the connecting part; and
wherein the body seal lip is positioned to make elastic contact with the circumferential edge of the door opening of the body of the automobile.

3. The glass run according to claim 1, wherein the channel forming the concave part has a depth that is greater than a width of an opening of the channel.

4. The glass run according to claim 2, wherein the channel forming the concave part has a depth that is greater than a width of an opening of the channel.

5. A glass run for a door of an automobile, for guiding a door glass in a frame, the glass run comprising:
a body including an outer-cabin side wall, an inner-cabin side wall, and a glass run side wall which connects the outer-cabin side wall and the inner-cabin side wall and forms a channel;
an installation member having a substantially U-shaped cross-section, the installation member comprising:
the glass run side wall;
a body side wall;
a connecting wall which connects the glass run side wall and the body side wall;
a connecting part at which the body side wall is connected to the connecting wall;
an anchoring part formed on an inner side of the installation member; and
a concave part provided as a channel recessed into an inner side of the connecting part, such that the connecting part is thinner than parts of the body side wall and the connecting wall that are adjacent to the connecting part, wherein the concave part extends in a direction from the inner side of the connecting part toward an outer side of the connecting wall of the installation member; and
a decorative member provided on the outer side of the connecting wall of the installation member;
wherein the installation member is configured to be assembled on a flange that extends outwardly from the frame toward an exterior of the automobile, the flange having a plurality of elevated parts rising from an outside surface thereof at regular intervals;
wherein the anchoring part of the installation member is configured to receive the elevated parts of the flange; and
wherein the body side wall of the installation member is configured to face a circumferential edge of a door opening of a body of the automobile.

6. The glass run according to claim 5, further comprising:
a body seal lip which extends outward from the body side wall of the installation member;
wherein a base root of the body seal lip is on an outer side of the connecting part; and
wherein the body seal lip is positioned to make elastic contact with the circumferential edge of the door opening of the body of the automobile.

7. The glass run according to claim 5, wherein the channel forming the concave part has a depth that is greater than a width of an opening of the channel.

8. A glass run for a door of an automobile, for guiding a door glass in a frame, the glass run comprising:
a body including an outer-cabin side wall, an inner-cabin side wall, and a glass run side wall which connects the outer-cabin side wall and the inner-cabin side wall and forms a channel;
an installation member having a substantially U-shaped cross-section, the installation member comprising:
the glass run side wall;
a body side wall;
a connecting wall which connects the glass run side wall and the body side wall;
a connecting part at which the body side wall is connected to the connecting wall;
an anchoring part formed on an inner side of the installation member; and
a concave part provided as a channel recessed into an inner side of the connecting part, such that the connecting part is thinner than parts of the body side wall and the connecting wall that are adjacent to the connecting part, wherein the concave part extends in a direction from the inner side of the connecting part toward an outer side of the body side wall of the installation member; and
a decorative member provided on an outer-cabin side of the connecting wall of the installation member;
wherein the installation member is configured to be assembled on a flange that extends outwardly from the frame toward an exterior of the automobile, a top end of the flange being folded inwardly toward an interior of the automobile;
wherein the anchoring part of the installation member is configured to receive the top end of the flange; and
wherein the body side wall of the installation member is configured to face a circumferential edge of a door opening of a body of the automobile.

9. The glass run according to claim 8, further comprising:
a body seal lip which extends outward from the body side wall of the installation member;
wherein a base root of the body seal lip is on an outer side of the connecting part; and
wherein the body seal lip is positioned to make elastic contact with the circumferential edge of the door opening of the body of the automobile.

10. The glass run according to claim 8, wherein the channel forming the concave part has a depth that is greater than a width of an opening of the channel.

11. The glass run according to claim 9, wherein the channel forming the concave part has a depth that is greater than a width of an opening of the channel.

12. A glass run for a door of an automobile, for guiding a door glass in a frame, the glass run comprising:
a body including an outer-cabin side wall, an inner-cabin side wall, and a glass run side wall which connects the outer-cabin side wall and the inner-cabin side wall and forms a channel;
an installation member having a substantially U-shaped cross-section, the installation member comprising:
the glass run side wall;
a body side wall;
a connecting wall which connects the glass run side wall and the body side wall;
a connecting part at which the body side wall is connected to the connecting wall;

an anchoring part formed on an inner side of the installation member; and a concave part provided as a channel recessed into an inner side of the connecting part, such that the connecting part is thinner than parts of the body side wall and the connecting wall that are adjacent to the connecting part, wherein the concave part extends in a direction from the inner side of the connecting part toward an outer side of the connecting wall of the installation member; and a decorative member provided on the outer side of the connecting wall of the installation member;

wherein the installation member is configured to be assembled on a flange that extends outwardly from the frame toward an exterior of the automobile, a top end of the flange being folded inwardly toward an interior of the automobile;

wherein the anchoring part of the installation member is configured to receive the top end of the flange; and wherein the body side wall of the installation member is configured to face a circumferential edge of a door opening of a body of the automobile.

13. The glass run according to claim 12, further comprising:

a body seal lip which extends outward from the body side wall of the installation member;

wherein a base root of the body seal lip is on an outer side of the connecting part; and wherein the body seal lip is positioned to make elastic contact with the circumferential edge of the door opening of the body of the automobile.

14. The glass run according to claim 12, wherein the channel forming the concave part has a depth that is greater than a width of an opening of the channel.

* * * * *

UNITED STATES PATENT AND TRADEMARK OFFICE
CERTIFICATE OF CORRECTION

PATENT NO. : 10,220,692 B2  
APPLICATION NO. : 15/667615  
DATED : March 5, 2019  
INVENTOR(S) : Kousuke Mori

Page 1 of 1

It is certified that error appears in the above-identified patent and that said Letters Patent is hereby corrected as shown below:

On the Title Page

In item (72) after "Kosuke Mori, Hiroshima (JP)" insert:  
--Hisatoshi KINOSHITA, Hiroshima (JP); Noboru SHOUNO, Hiroshima (JP); and Yusuke MIGAKI, Hiroshima (JP)--.

Signed and Sealed this  
Twenty-seventh Day of October, 2020

Andrei Iancu  
*Director of the United States Patent and Trademark Office*